US010369949B2

(12) United States Patent  
Miller

(10) Patent No.: US 10,369,949 B2  
(45) Date of Patent: Aug. 6, 2019

(54) REAR IMPACT GUARD

(71) Applicant: STI Holdings, Inc., Stoughton, WI (US)

(72) Inventor: Daniel P. Miller, Madison, WI (US)

(73) Assignee: STI Holdings, Inc., Stoughton, WI (US)

( * ) Notice: Subject to any disclaimer, the term of this patent is extended or adjusted under 35 U.S.C. 154(b) by 32 days.

(21) Appl. No.: 15/906,479

(22) Filed: Feb. 27, 2018

(65) Prior Publication Data

US 2018/0244227 A1 Aug. 30, 2018

Related U.S. Application Data

(60) Provisional application No. 62/464,069, filed on Feb. 27, 2017.

(51) Int. Cl.
*B60R 19/56* (2006.01)
*B60R 19/24* (2006.01)

(52) U.S. Cl.
CPC .............. *B60R 19/56* (2013.01); *B60R 19/24* (2013.01)

(58) Field of Classification Search
CPC ................................ B60R 19/56; B60R 19/24
USPC ........................................................ 293/155
See application file for complete search history.

(56) References Cited

U.S. PATENT DOCUMENTS

| | | |
|---|---|---|
| 3,578,358 A | 5/1971 | Reynolds |
| 3,698,609 A | 10/1972 | Lund |
| 3,871,695 A | 3/1975 | Koenig |
| 4,359,239 A | 11/1982 | Eggert, Jr. |
| 4,514,002 A | 4/1985 | McIntosh |
| 5,507,546 A | 4/1996 | Holley |
| 5,632,518 A | 5/1997 | Kendall |

(Continued)

FOREIGN PATENT DOCUMENTS

| | | |
|---|---|---|
| CA | 2218514 | 10/1996 |
| CA | 2240821 | 1/1999 |

(Continued)

OTHER PUBLICATIONS

"Crash Test #3" downloaded from http://www.fem.unicamp.brHmpacl/crashcrm.htm, publicly available prior to Jun. 3, 2015 (2 pages).
"Crash Test #2" downloaded from http://www.fem.unicamp.brHmpacl/articul.htm, publicly available prior to Jun. 3, 2015 (2 pages).
"Crash Test #4" downloaded from http://www.fem.unicamp.brHmpacl/Intelligentunderrideguard.htm, publicly available prior to Jun. 3, 2015 (2 pages).

(Continued)

*Primary Examiner* — Pinel E Romain
(74) *Attorney, Agent, or Firm* — Michael Best & Friedrich LLP

(57) ABSTRACT

A trailer includes front and rear ends spaced in a longitudinal direction to define a cargo area. A frame includes a rear bolster extending in a transverse direction across the rear end below a bottom rear edge of the cargo area. Spaced rear frame posts extend upwardly from respective distal ends of the rear bolster. A rear impact guard includes a bumper extending transversely and spaced below the rear bolster, a pair of outboard posts extending between the bumper and the rear bolster adjacent the respective distal ends of the rear bolster, and at least one inboard post. Each of the outboard posts has a rearward-extending horizontal first flange and an upward-extending vertical second flange spaced forwardly of the first flange, these flanges including multiple apertures aligned with apertures in the trailer frame, each of the apertures accommodating a removable fastener securing the rear impact guard to the trailer frame.

23 Claims, 14 Drawing Sheets

(56) References Cited

U.S. PATENT DOCUMENTS

| | | | |
|---|---|---|---|
| 5,673,953 | A | 10/1997 | Spease |
| D386,129 | S | 11/1997 | Jantz |
| 6,076,871 | A | 6/2000 | Jarvis et al. |
| 6,089,629 | A | 7/2000 | Hope et al. |
| 6,109,675 | A | 8/2000 | Sumrall |
| 6,116,667 | A | 9/2000 | Torcomian |
| 6,176,529 | B1 | 1/2001 | Kitzmiller et al. |
| 6,264,258 | B1 | 7/2001 | Li et al. |
| 6,520,469 | B1 | 2/2003 | DiMauro |
| 6,523,872 | B2 | 2/2003 | Breed |
| 6,604,765 | B1 | 8/2003 | Eull |
| 6,626,475 | B2 | 9/2003 | Schroeder |
| 6,652,010 | B1 | 11/2003 | Huddle et al. |
| 6,656,010 | B1 | 11/2003 | Huddle et al. |
| 6,764,116 | B2 | 7/2004 | Ledford et al. |
| 6,799,783 | B2 | 10/2004 | Gollungberg et al. |
| D503,838 | S | 4/2005 | Archambault |
| 6,962,378 | B2 | 11/2005 | Ledford et al. |
| 6,974,166 | B2 | 12/2005 | Ledford et al. |
| 7,086,674 | B2 | 8/2006 | Goertz |
| 7,188,875 | B2 | 3/2007 | Norelius |
| 7,284,788 | B1 | 10/2007 | Barbat et al. |
| 7,407,204 | B2 | 8/2008 | Eriksson et al. |
| 7,455,337 | B2 | 11/2008 | Andersson |
| 7,527,309 | B2 | 5/2009 | Smidler |
| 7,530,612 | B2 | 5/2009 | Regnell et al. |
| 7,900,983 | B2 | 3/2011 | Saitou |
| 7,950,705 | B2 | 5/2011 | Saitou |
| 7,967,349 | B2 | 6/2011 | Puppini et al. |
| 8,100,465 | B2 | 1/2012 | Wylezinski |
| D658,549 | S | 5/2012 | Neumann et al. |
| D703,106 | S | 4/2014 | Deighton |
| 8,714,792 | B2 | 5/2014 | Adams |
| 8,720,924 | B2 | 5/2014 | Ruehl |
| 8,950,793 | B2 | 2/2015 | Deighton |
| 9,199,594 | B2 | 12/2015 | Musale et al. |
| 9,566,923 | B2 | 2/2017 | Wylezinski et al. |
| 2001/0030431 | A1 | 10/2001 | Killday |
| 2004/0061357 | A1 | 4/2004 | Long et al. |
| 2008/0073921 | A1 | 3/2008 | Smidler |
| 2008/0073925 | A1 | 3/2008 | Wylezinski |
| 2008/0116702 | A1 | 5/2008 | Enz et al. |
| 2009/0001768 | A1 | 1/2009 | Saitou |
| 2009/0102209 | A1 | 4/2009 | Ryden et al. |
| 2015/0258951 | A1 | 9/2015 | Wylezinski et al. |
| 2015/0367798 | A1 | 12/2015 | Bobba |
| 2017/0050595 | A1 | 2/2017 | Miller et al. |
| 2017/0050596 | A1 | 2/2017 | Miller et al. |

FOREIGN PATENT DOCUMENTS

| | | |
|---|---|---|
| CA | 2228428 | 7/1999 |
| CA | 2275051 | 12/1999 |
| CA | 2292482 | 6/2001 |
| CA | 2328034 | 6/2001 |
| CA | 2466942 | 6/2003 |
| CA | 2866194 | 9/2013 |
| MX | 154197 | 6/1987 |
| MX | 9400055 | 7/1994 |

OTHER PUBLICATIONS

Auto Safety Expert, "Truck Underride Hazards," downloaded from http://www.autosafetyexpert.com/ defect_truckunderride.php, publicly available prior to Jun. 3, 2015 (2 pages).

Annaleah & Mary,Truck Safety, "The Future of Trucking; Who pays for the costs of safer roads?" downloaded from <http://annaleahmary.com/tag/underride-guards/> Jun. 5, 2015 (4 pages).

Annaleah & Mary,Truck Safety, "Truck Drivers: Please make sure your underride (rear impact) guards are in good shape!" downloaded from <http://annaleahmary.com/tag/underride-guards/> Jun. 2, 2015 (6 pages).

Annaleah & Mary.Truck Safety. "Underride Conversation with David Friedman. NHTSA Deputy Administrator," downloaded from <http://annaleahmary.com/tag/underride-guards/> May 15, 2015 (3 pages).

Annaleah & Mary,Truck Safety, "Be a part of our team to promote safety & save lives," downloaded from <http:// annaleahmary.com/tag/underride-guards/> Apr. 30, 2015 (3 pages).

Annaleah & Mary,Truck Safety, "What Came After the Annaleah & Mary Stand Up for Truck Safety Petition?" downloaded from <http://annaleahmary.com/tag/underride-guards/> Mar. 8, 2015 (6 pages).

Annaleah & Mary,Truck Safety, "Help Us Design the Best Possible Underride Guard," downloaded from <http:// annaleahmary.com/tag/underride-guards/> Dec. 22, 2014 (5 pages).

Annaleah & Mary,Truck Safety, "The Passion of This Safety Advocate," downloaded from <http://annaleahmary.com/ tag/underride-guards/> Dec. 20, 2014 (2 pages).

Annaleah & Mary,Truck Safety, "Underride Guards; Let's Move Forward In 2015," downloaded from <http:// annaleahmary.com/tag/underride-guards/> Dec. 20, 2014 (2 pages).

Annaleah & Mary,Truck Safety, "IIHS Reports on New Crash Testing for Improved Underride Guards," downloaded from <http://annaleahmary.com/tag/underride-guards/> Oct. 9, 2014 (2 pages).

Trailer Update: A Vehicle for Every Haul, Jul. 2015 see p. 9-10, Vanguard National (17 pages).

CF16001 Vanguard 30, Feb. 2016 (15 pages).

CF14003 Vanguard 50, Jan. 2015 (14 pages).

Transport Topics, Wabash to Introduce New Rear Impact Guard, downloaded at http://www.ttnews.com/articles/basetemplate.aspx.storyid=40928&utm_source=equipment&utm_medium=newsletter&utm_campaign=newsletter, Feb. 17, 2016 (1 page).

Photo of trailer with underride guard, <http://www.awjlaw.com/images/shutterstock_35651434.jpg> publicly available as early as Jun. 23, 2015 (1 page).

Boiles de camions Dynamic, "Truck Boxes Dynamic 4 types of construction of its refrigerated boxes," 2013 (3 pages).

FOX 5 Investigates: Deadly danger on the roads, Sep. 12, 2012 (2 pages).

Insurance Institute for Highway Safety, "On guard: Safety gear on the back of truck trailers is improving," Status Report, vol. 49, No. 7, Oct. 9, 2014 (3 pages).

Insurance Institute for Highway Safety, "Not good enough: Underride guards on big rigs can be lifesavers, but most leave passenger vehicle occupants at risk in certain crashes," Status Report, vol. 48, No. 2, Mar. 14, 2013 (6 pages).

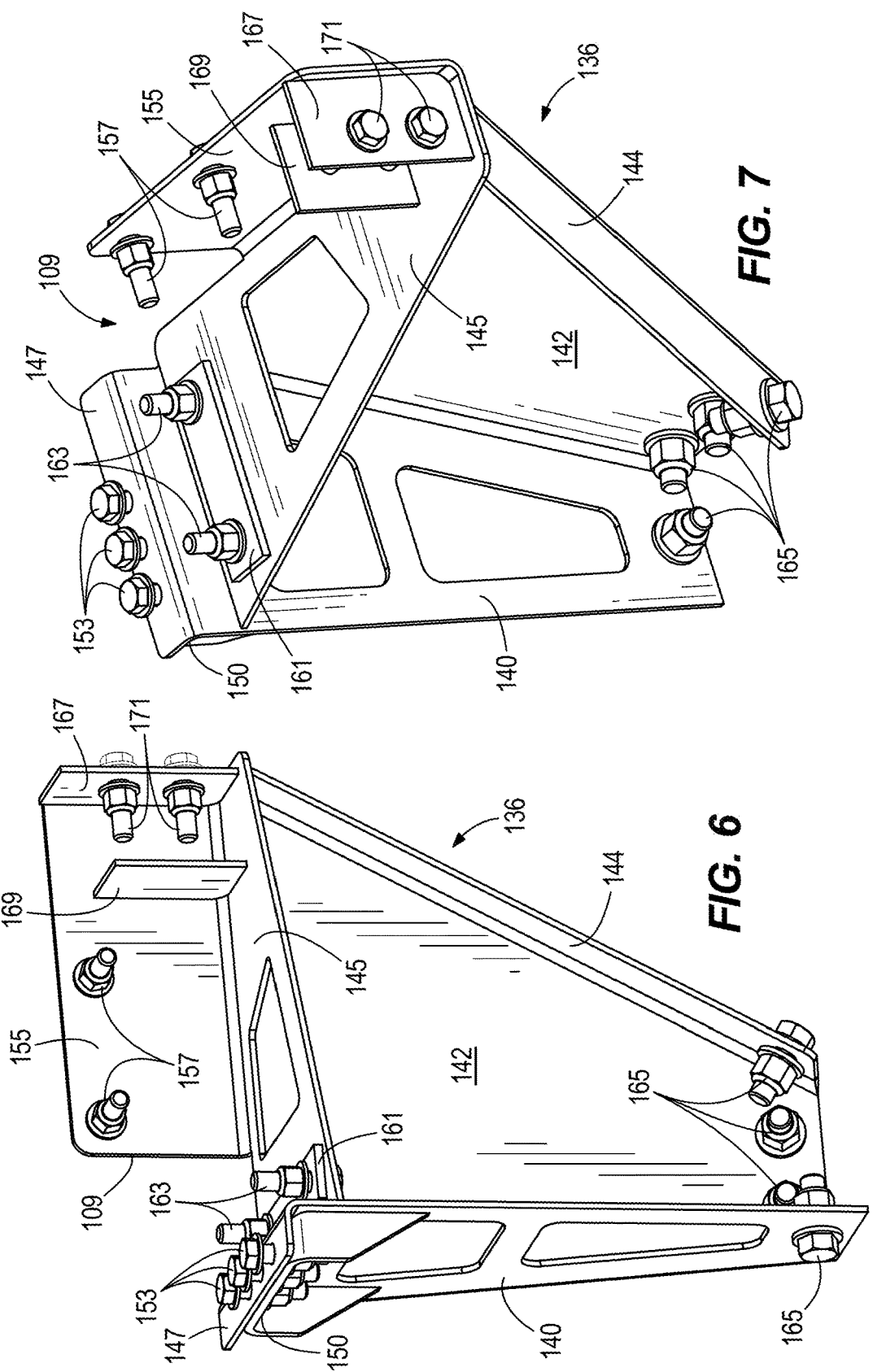

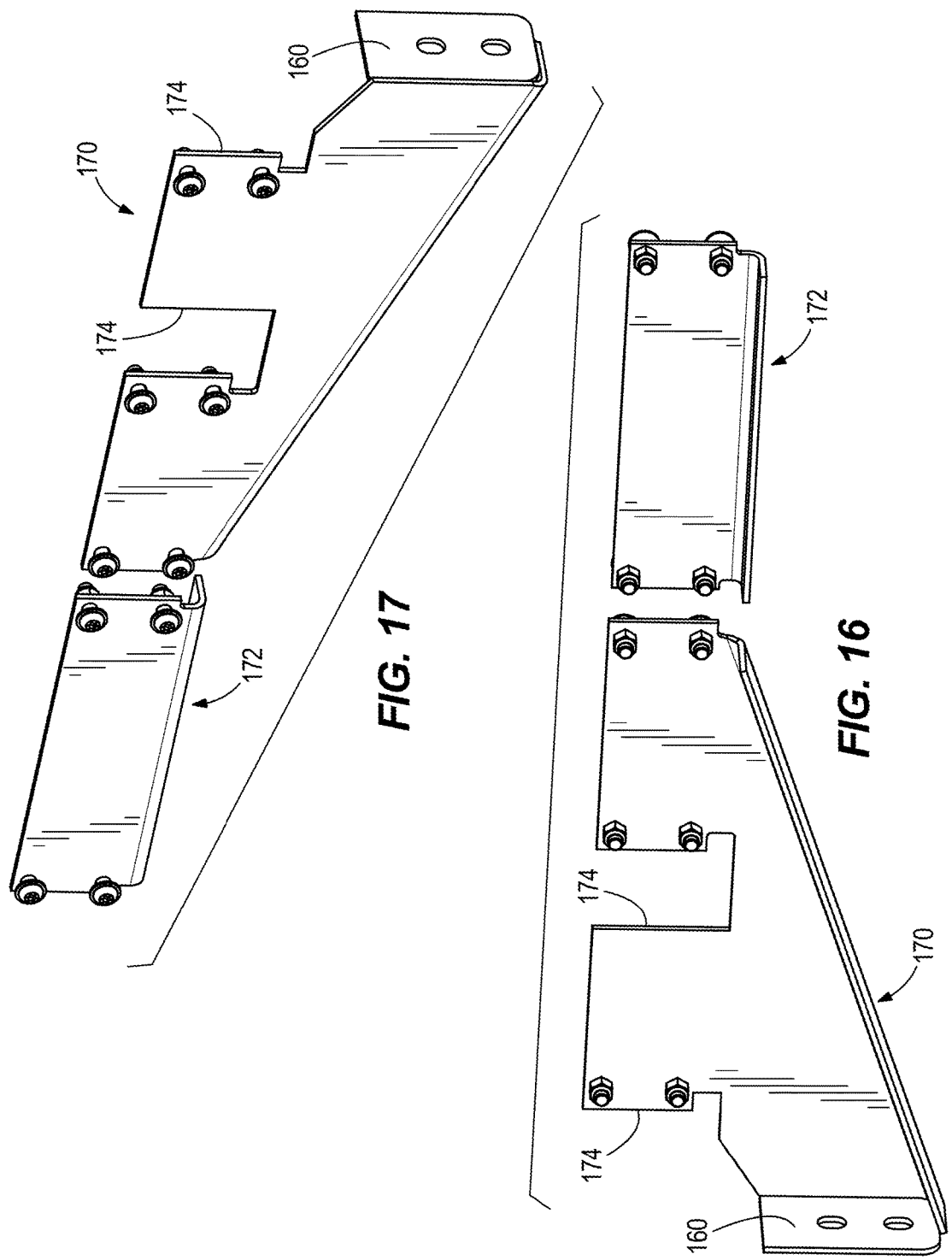

REAR IMPACT GUARD

CROSS-REFERENCE TO RELATED APPLICATIONS

This application claims priority to U.S. Provisional Patent Application No. 62/464,069, filed Feb. 27, 2017, the entire contents of which are incorporated by reference herein.

BACKGROUND

The invention relates to over-the-road trailers and rear impact guards thereof. A conventional trailer 1000 is shown in FIG. 18, and is configured for over-the-road use with a truck to transport large cargo volumes. The trailer 1000 has a defined front end 1020 adapted for attachment with the truck, and a defined rear end 1040 opposite the front end 1020. A front-rear, or lengthwise direction X is defined between the front and rear ends 1020, 1040. A transverse or lateral direction Y is defined perpendicular to the lengthwise direction X. The lengthwise and lateral directions Y are both parallel to a ground surface along which the trailer 1000 is conveyable. The rear end 1040 in many cases is provided with doors for accessing the cargo area defined between the front and rear ends 1020, 1040 (and between the sidewalls 1050 and roof 1060, if so equipped). At the rear end 1040 of the trailer, a rear impact guard 1100 is provided. The rear impact guard 1100 complies with federal mandates for many common types of trailers and is designed to reduce the severity of a crash when a vehicle following the trailer 1000 impacts the rear end 1040 of the trailer 1000. The rear impact guard 1100 provides a lowered bumper 1110 below the rear sill or rear bolster 1130 at the bottom rear end of the cargo area. However, it may be desirable to further improve safety, especially for off-center impacts, while minimizing cost and weight penalties to the trailer.

SUMMARY

In one aspect, the invention provides a trailer having a front end provided for attachment to a truck, a rear end spaced in a longitudinal direction from the front end to define a cargo area between the front and rear ends, and a frame. The frame includes a rear bolster, a plurality of cross-members, and a pair of corner gussets extending forwardly from respective distal ends of the rear bolster. The rear bolster extends transversely to the longitudinal direction below a bottom rear edge of the cargo area. A rear impact guard of the trailer includes a bumper positioned at the rear end of the trailer and spaced below the rear bolster, a pair of outboard posts, and at least one inboard post. The pair of outboard posts extend between the bumper and the rear bolster adjacent respective opposed distal ends of the bumper, and the at least one inboard post extends between the bumper and the rear bolster at a location laterally between the pair of outboard posts. Each of the pair of outboard posts is provided with a rearward-extending horizontal first flange and an upward-extending vertical second flange. Each of the first and second flanges includes multiple apertures aligned with corresponding apertures provided in the trailer frame, and fasteners are engaged with the apertures of the first and second flanges and the corresponding apertures in the trailer frame to secure the outboard post to the trailer frame.

In another aspect, the trailer can further include a lateral reinforcement member that is fastened in place with removable fasteners to extend from a first location at a lateral edge of the trailer frame and a second location spaced laterally-inward and rearward of the first location so that the lateral reinforcement member is loaded in tension upon rear impact of an object with the bumper.

In another aspect, the rear bolster of the trailer can further include a light guard at least partially surrounding at least one tail light aperture, the light guard providing the apertures corresponding to the apertures in the rearward-extending horizontal first flange of the outboard post.

In another aspect, the corner gussets can provide the apertures corresponding to the apertures in the upward-extending vertical second flange of the outboard post.

In another aspect, the invention provides a rear impact guard kit for converting an existing trailer rear impact guard, the kit including a pair of outboard posts and a plurality of trailer frame reinforcement members. Each of the pair of outboard posts is configured to be secured to the trailer frame at a first joint having vertically-extending first fasteners along a rear edge of the outboard post and at a second joint having horizontally-extending second fasteners along a lateral edge of the outboard post, forward of the first fasteners.

In another aspect, the invention provides a method of retro-fitting an existing trailer rear impact guard with the rear impact guard kit including the pair of outboard posts and the plurality of trailer frame reinforcement members.

In another aspect, the invention provides a trailer having a front end provided for attachment to a truck and a rear end spaced in a longitudinal direction from the front end to define a cargo area between the front and rear ends. A frame of the trailer includes a rear bolster extending in a transverse direction across the rear end of the trailer below a bottom rear edge of the cargo area, the rear bolster including at each end a light guard at least partially surrounding at least one tail light aperture formed therein. A pair of spaced rear frame posts extends upwardly from respective distal ends of the rear bolster. A pair of lower rails extends forwardly from respective lower portions of the pair of rear frame posts. Each of a pair of corner gussets is secured in position to fortify a joint between one of the pair of rear frame posts and a respective one of the pair of lower rails. A rear impact guard includes a bumper extending transversely and spaced below the rear bolster, a pair of outboard posts extending between the bumper and the rear bolster adjacent the respective distal ends of the rear bolster, and at least one inboard post extending between the bumper and the rear bolster at a location between the pair of outboard posts. Each of the pair of outboard posts is secured to the trailer frame with a plurality of joints, each of the plurality of joints including at least one removable fastener. The plurality of joints includes a first joint established between a first flange of the outboard post and the light guard, and a second joint established between a second flange of the outboard post and the corner gusset.

In another aspect, the invention provides a rear impact guard kit for converting an existing trailer rear impact guard having a bumper with free distal ends to a rear impact guard in which the distal bumper ends are secured to a rear bolster of the trailer. The kit includes a pair of outboard posts, each of which includes a lower end adapted for securement with a respective one of the distal bumper ends and an upper end adapted for securement with a respective distal end of the rear bolster. For each of the pair of outboard posts, there is at least one reinforcement member configured to fortify a joint between a trailer frame rear frame post and a trailer frame lower rail at the distal end of the rear bolster. For each of the pair of outboard posts, there is a first fastener extending vertically to define a first joint along a rearward portion of the upper end of the outboard post. For each of the pair of outboard posts, there is a second fastener extending horizontally to define a second joint along a laterally outboard portion of the upper end of the outboard post.

BRIEF DESCRIPTION OF THE DRAWINGS

FIG. 6 is a first perspective view of an outboard post of the rear impact guard of FIGS. 1-5.

FIG. 7 is a second perspective view of the outboard post of FIG. 6.

FIGS. 16 and 17 are perspective views of the bottom rail reinforcement members.

DETAILED DESCRIPTION

Figure 1:
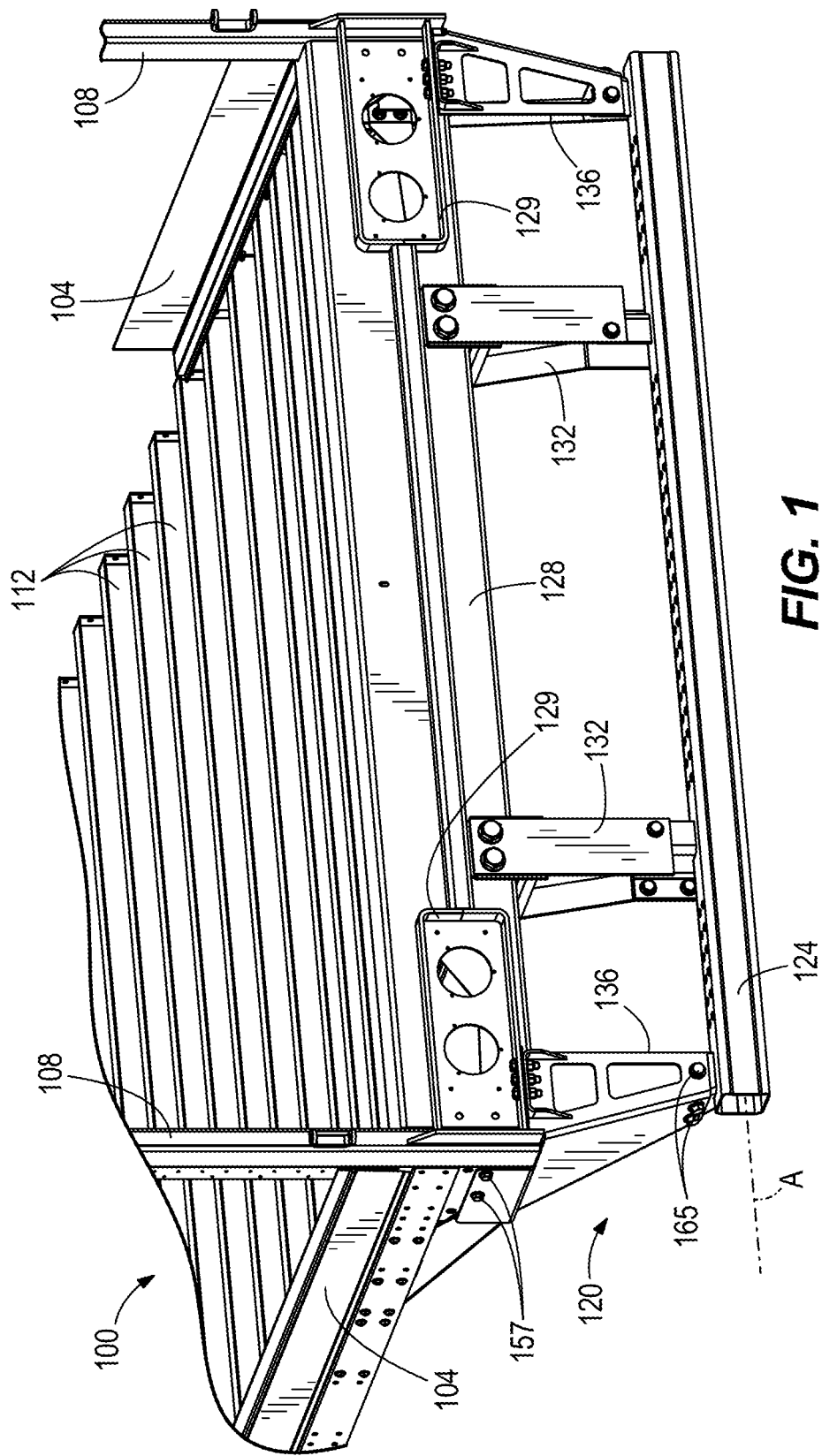
FIG. 1 is a perspective view of a rear portion of a trailer, including a rear impact guard according to one embodiment of the invention.
Figure 18:
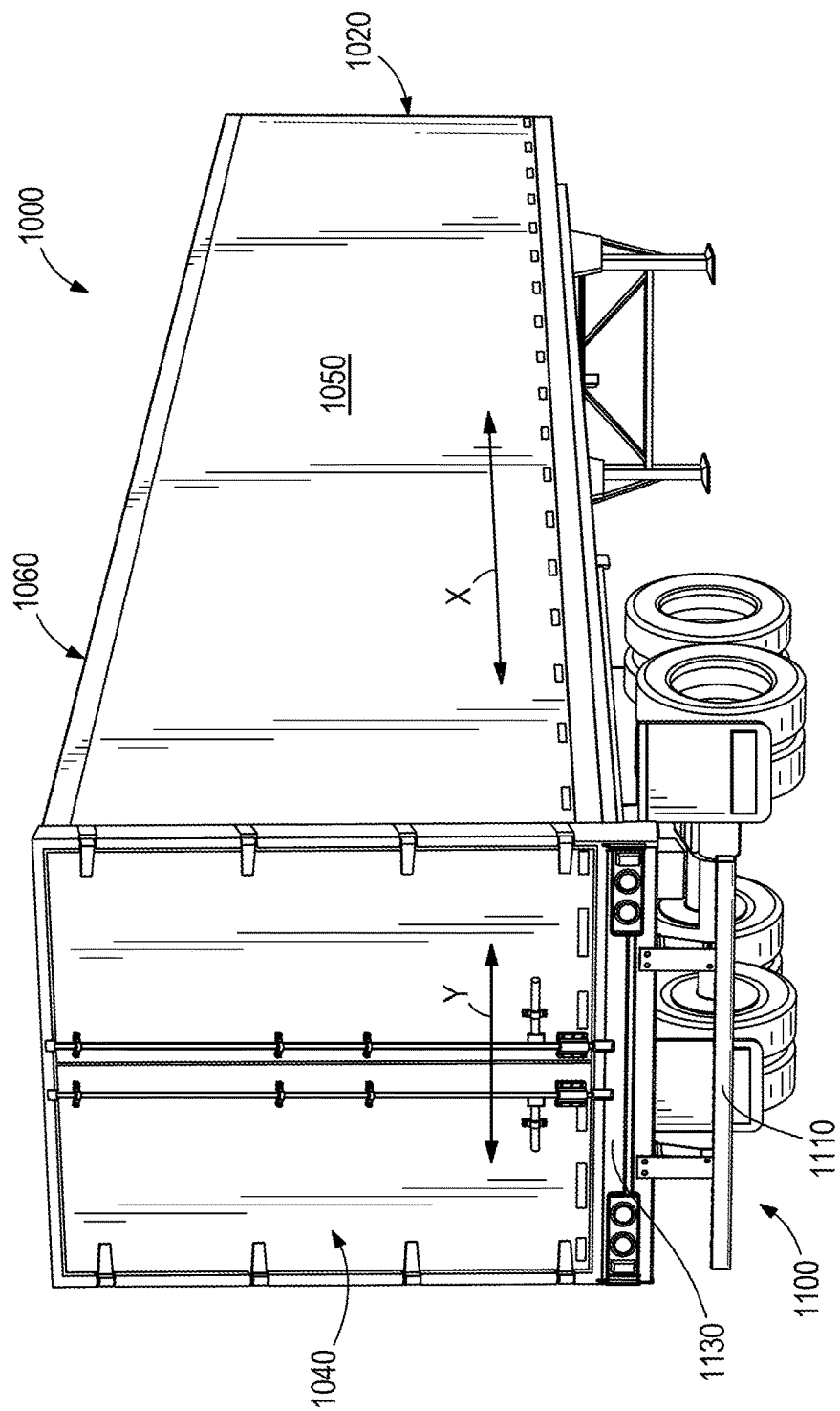
FIG. 18 is a perspective view of a trailer, according to the prior art.

FIG. 1 illustrates a rear portion of a trailer 100, which in some embodiments can be a trailer configured for over-the-road use with a road tractor (e.g., in forming a so-called 18-wheeler) to transport large amounts of cargo. Aspects of the invention may not be limited to such types of trailers however, and it will be understood that features described herein may also apply to many other types of trailers, including those typically having rear impact guards, and others that may not. Similar to the conventional trailer of FIG. 18, the trailer 100 can include a chassis having axles with multiple sets of wheels. The trailer 100 defines a length in a longitudinal or transport direction between its front and rear ends. The length of the trailer 100 can be 53 feet in some constructions, although the trailer 100 can be manufactured to other lengths greater than or less than 53 feet. Perpendicular to the longitudinal direction, the trailer 100 defines a width and a height. The width cooperates with the length to define a plan view footprint of the trailer 100, while the height is measured perpendicular to the footprint (which can be perpendicular to the ground). Subtracting for wall thicknesses, the length, the width, and the height cooperate to define a cargo-receiving interior volume of the trailer 100. The illustrated trailer 100 includes sidewalls, a roof, and a floor, although in other embodiments the trailer only has a floor, or only has a floor and less than four complete sidewalls. While not shown in entirety, the illustrated trailer 100 is an enclosed trailer, but the trailer may be a non-enclosed trailer in other constructions. In any construction, the trailer 100 defines a cargo area operable to receive a load of cargo for transport. Longitudinal top rails and longitudinal bottom rails 104 extend along the length of the trailer 100 at the lateral side edges at the tops and bottoms of the lateral sidewalls, respectively. At a rear of the trailer 100 as shown in FIG. 1, an opening is provided to selectively access the cargo area for loading and unloading cargo. One or more doors may be provided to selectively close the opening. The trailer 100 also has a load floor (not shown) for receiving and supporting cargo for transport. In some aspects, FIG. 1 may illustrate the conventional trailer of FIG. 18 after conversion or retro-fitting with a kit for providing an improved rear impact guard 120. As described in further detail with the remainder of the drawings, the rear impact guard 120 can include outboard posts 136 where none were originally present on the conventional trailer of FIG. 18 (i.e., the original rear impact guard of the trailer may include a bumper secured to only one pair of inboard posts such that the distal ends of the bumper are unsupported).

Figure 8:
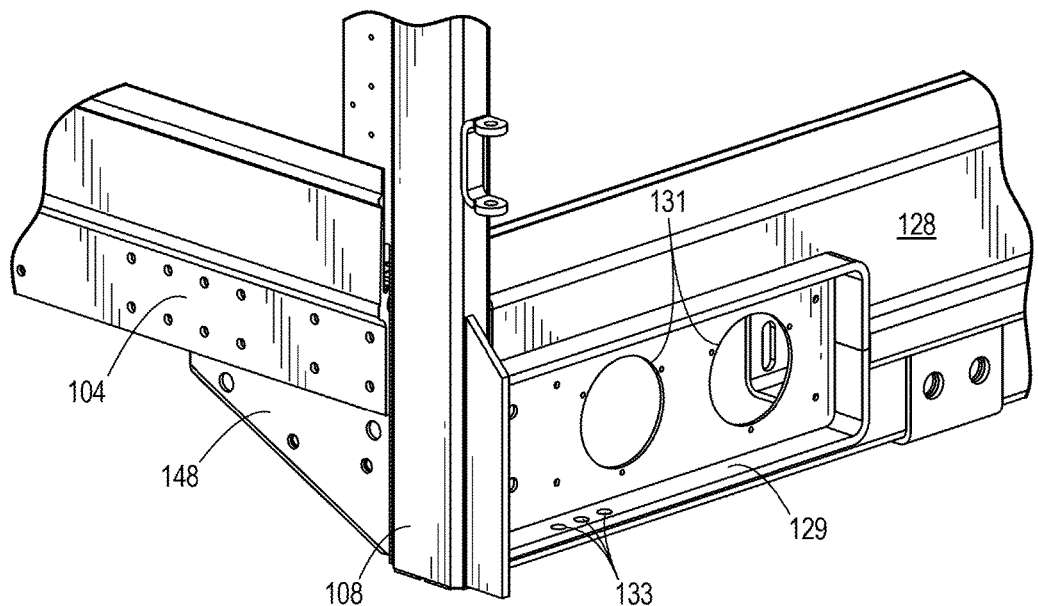
FIG. 8 is a perspective view of an outboard portion of the trailer frame prior to attachment of the rear impact guard including the outboard posts.
Figure 9:
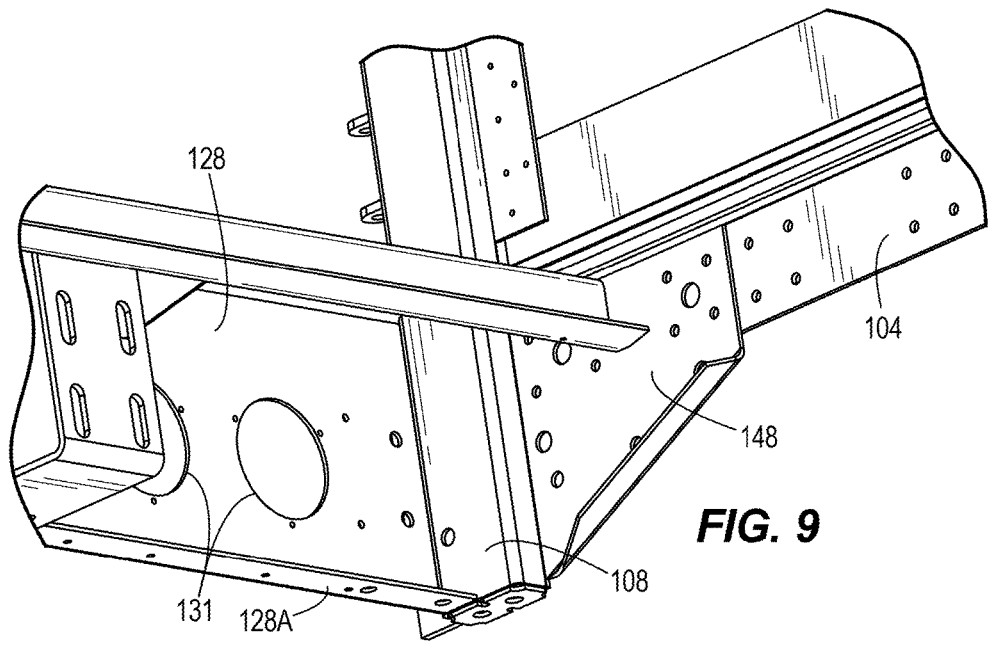
FIG. 9 is a perspective view of an outboard portion of the trailer frame prior to attachment of the rear impact guard including the outboard posts, viewed from underneath the trailer.
Figure 10:
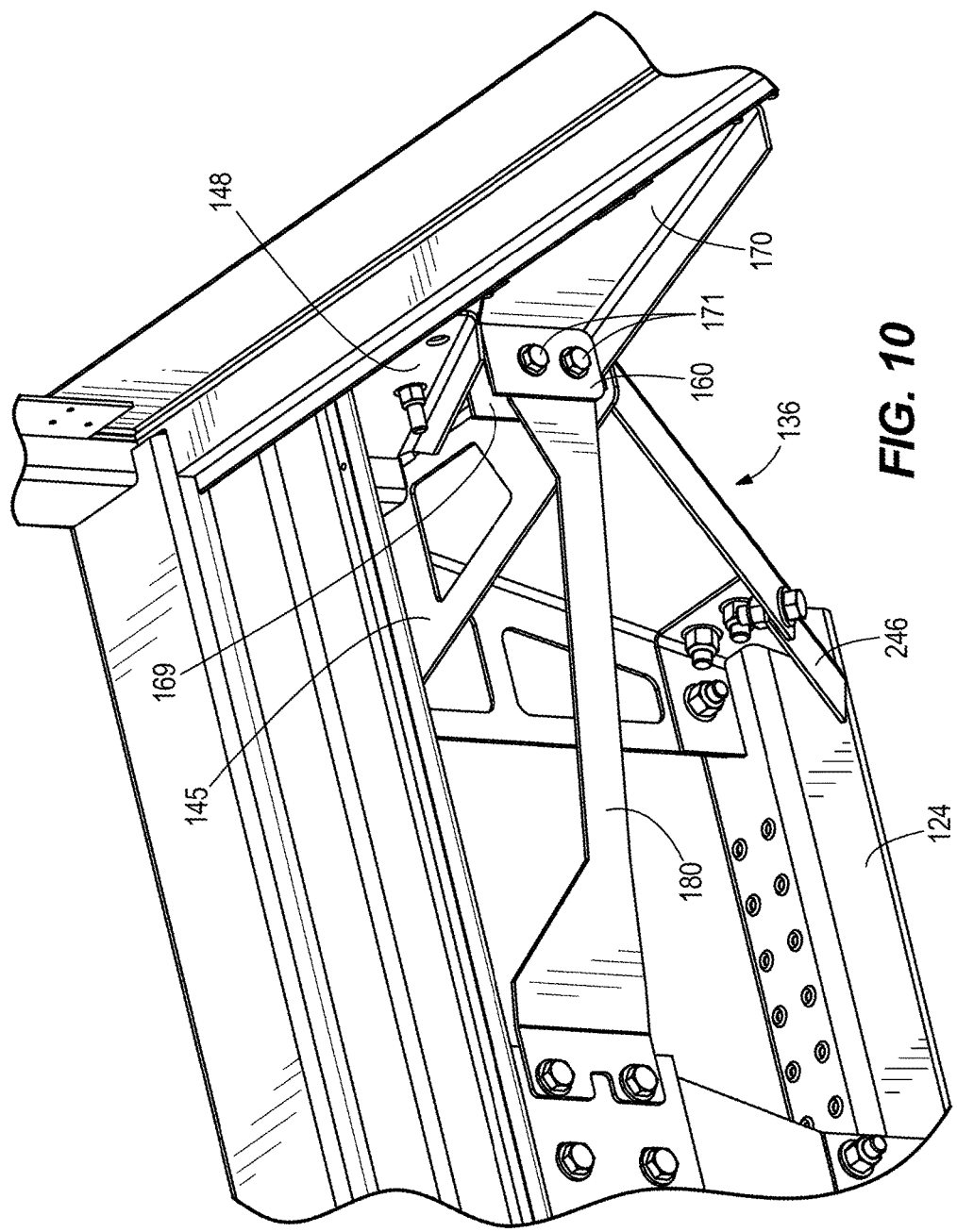
FIG. 10 is a perspective view of the rear impact guard of FIGS. 1-5 assembled to the trailer frame, as viewed from above.

Turning to FIG. 1, two vertically-extending rear frame posts 108 are provided at the rear end of the trailer 100. The rear frame posts 108 define the lateral sides of the opening into the cargo area of the trailer 100. Along with the longitudinal upper rails, the longitudinal bottom rails 104 terminate at and are secured to the corresponding rear frame posts 108. The rear frame posts 108 can have a hollow box structure, or other suitable construction. A rear sill or bolster 128 of the trailer frame extends along a bottom rear edge of the cargo area and has two opposing lateral distal ends secured to (e.g., welded to) the two rear frame posts 108. With reference to FIGS. 1-5, 8 and 9, the rear bolster 128 further includes a light guard 129 at least partially surrounding one or more tail light apertures 131. The light guard 129 projects rearwardly from a rear-facing surface of the rear bolster 128. A lower portion of the light guard 129 extends in a horizontal plane and is provided with a plurality of mounting apertures 133 (FIG. 8). Below the load floor, a plurality of spaced-apart cross-members 112 or floor joists are provided. The cross-members 112 can be spaced at intervals throughout the entire length of the trailer 100, each cross-member 112 extending along a respective horizontal axis that is transverse to the longitudinal direction of the trailer 100. A pair of longitudinally-extending slider rails 116 (one shown in FIGS. 3 and 5) extend underneath the cross-members 112 in the rear section of the trailer 100. The suspension supporting the wheels of the trailer 100 is coupled to the slider rails 116, allowing a certain amount of movement of the suspension relative to the slider rails 116. The bottom rails 104, the rear frame posts 108, the cross-members 112, and the slider rails 116, along with additional components described below form a frame of the trailer 100.

Although the frame as described above refers to permanent, originally-supplied components, the frame can be supplemented or reinforced to provide additional strength with a number of "bolt-on" components at the time of installing or converting to the rear impact guard 120 so that retrofitting of existing trailers is made possible via a "bolt-on" conversion. Although nuts and bolts can be the physical mechanism by which such a "bolt-on" conversion is provided as shown throughout the figures, other types of fasteners or joints can be used in some constructions, and the term "bolt-on" refers to the nature of the modification as not requiring substantial permanent modifications, and in particular not requiring any welding in the instant case. As such, the rear impact guard 120 and any accompanying supplemental reinforcements can be removed or replaced as needed without destructive effects to the permanent components of the trailer frame.

The rear impact guard 120 provided at the rear end of the trailer 100 is secured to the trailer frame, and in particular at least the rear bolster 128 of the frame. The rear impact guard 120 includes a plurality of elements structurally coupled to the trailer frame below the rear opening of the trailer 100. The rear impact guard 120 can include a bumper 124 extending along a horizontal axis A transversely across the rear of the trailer 100 at a height spaced below the cargo area. The bumper 124 can extend parallel and directly below the rear bolster 128. The bumper 124 may take any number of constructions, and may be a hollow bumper tube having a circular, rectangular, or square cross-section, among others. The illustrated bumper 124 is of tubular form, and has a modified square cross-section (when viewed along a transverse direction of the trailer 100, perpendicular to a front-rear direction of the trailer 100,) with four equal-length sides. The cross-section of the bumper 124 can be consistent throughout its length along an axis A. In the illustrated embodiment, the bumper 124 forms the lowest point of the rear impact guard 120 and extends across the entire width of the trailer 100, or at least within 100 mm of the lateral extremities of the trailer 100, although other bumper dimensions are possible. Multiple posts support the bumper 124 relative to the trailer 100, including at least one inboard post 132 (e.g., a pair as shown) and a pair of outboard posts 136. In some embodiments, including the illustrated embodiment, the inboard posts 132 are positioned within the central 70 percent of the width of the bumper 124, while the outboard posts 136 are positioned at the distal ends of the bumper 124 (e.g., connecting to the bumper 124 outside of the central 90 percent or the central 95 percent of the width of the bumper 124). The inboard posts 132 can be carried over from the pre-existing rear impact guard (e.g., FIG. 18). As such, the inboard posts 132 may not be part of the retro-fit kit that includes the bumper 124 and the outboard posts 136. In other constructions, the inboard posts 132 are part of the retro-fit kit, and the inboard posts 132 may be different from the pre-existing inboard posts in construction and/or means of attachment.

Details of the outboard posts 136 are described with respect to one of the outboard posts 136 (i.e., driver's side), while it will be understood that these features also apply to the other outboard post 136, which is formed as a mirror image. The outboard post 136 can be provided with multiple attachment surfaces at its lower end for attachment to the bumper 124 and multiple attachment surfaces at its upper end for attachment to the trailer frame (e.g., the rear bolster 128 and the corner gusset 148). Between the upper and lower ends of the outboard post 136, multiple panels are provided, including at least a rear panel 140 and a laterally outboard panel 142. The rear panel 140 has an outer surface facing the rear of the trailer 100, and the laterally outboard panel 142 has an outer surface facing laterally outward. In some embodiments, such as the illustrated embodiment, the post 136 further includes a forward panel 144 spaced forwardly of the rear panel 140. Although not required among all possible constructions, the three panels 140, 142, 144 can be integrally formed from a single sheet of material (e.g., bent with two bends) to distinguish the three non-planar panels 140, 142, 144. Any one or more of the panels 140, 142, 144 can include one or more apertures, openings, or cutouts for strategic weight relief to minimize the overall weight of the post 136 and the rear impact guard 120. Non-limiting examples are shown by the two apertures provided in the rear panel 140.

Figure 3:
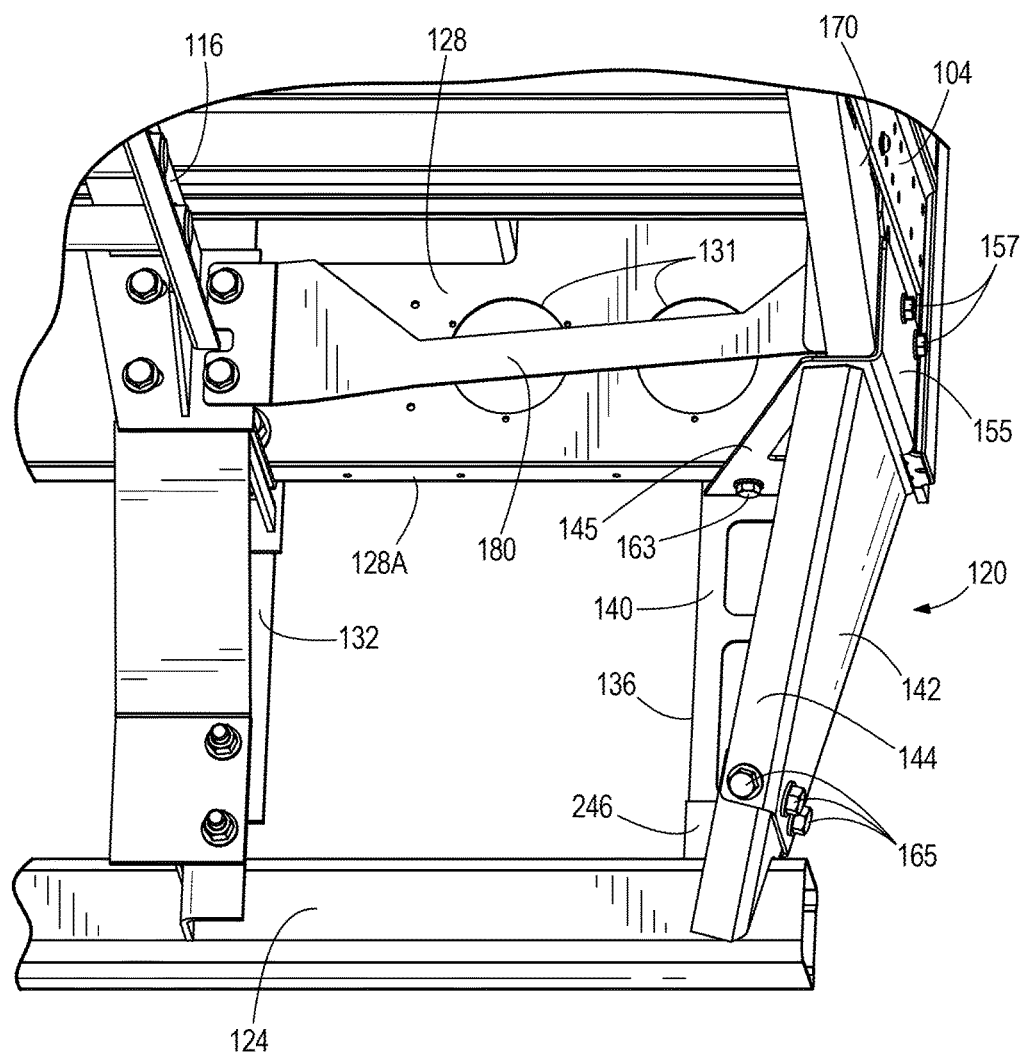
FIG. 3 is a perspective view of the laterally outer portion of the trailer of FIG. 2, viewed from underneath the trailer.
Figure 4:
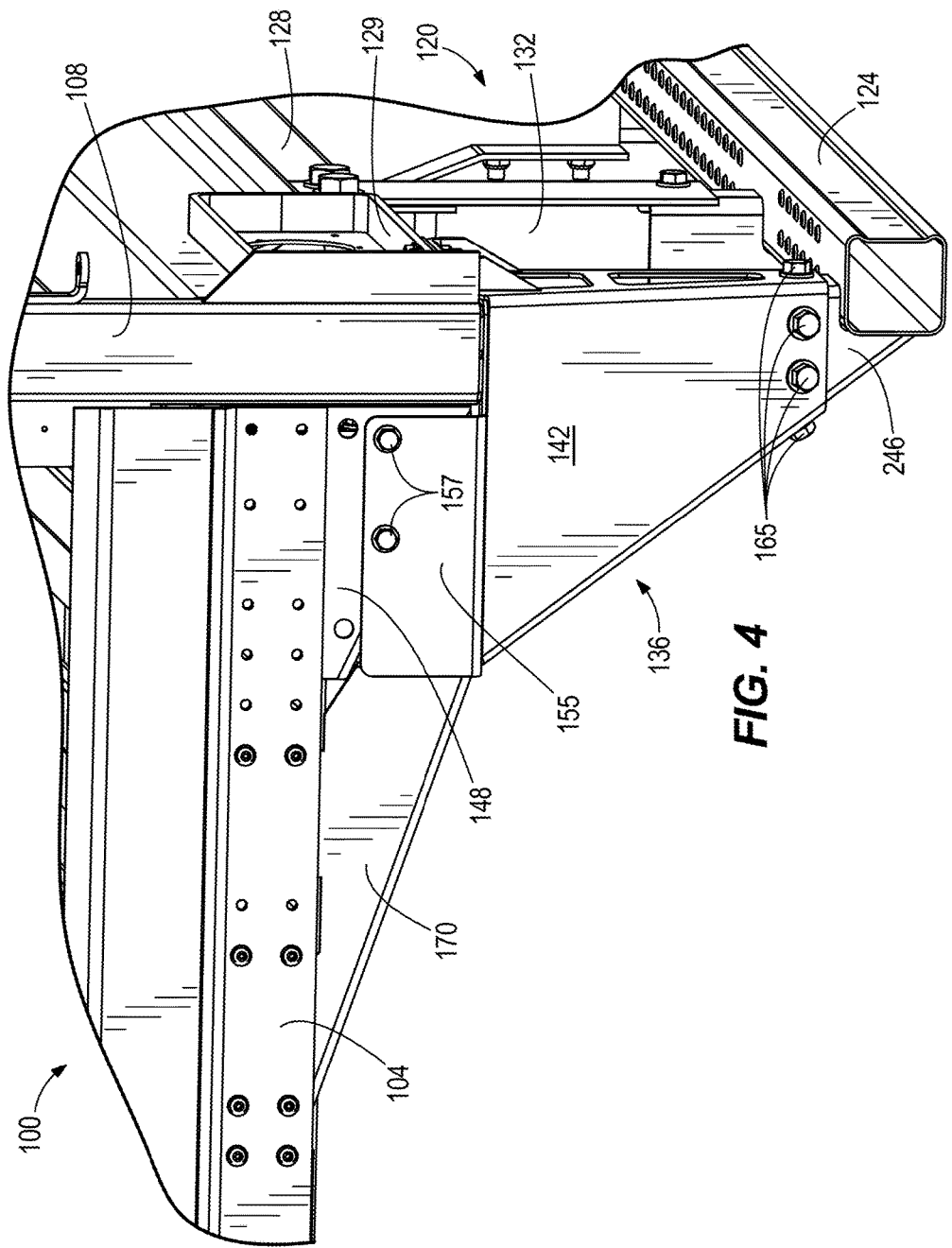
FIG. 4 is a perspective view of the laterally outer portion of the trailer shown in FIG. 2.
Figure 11:
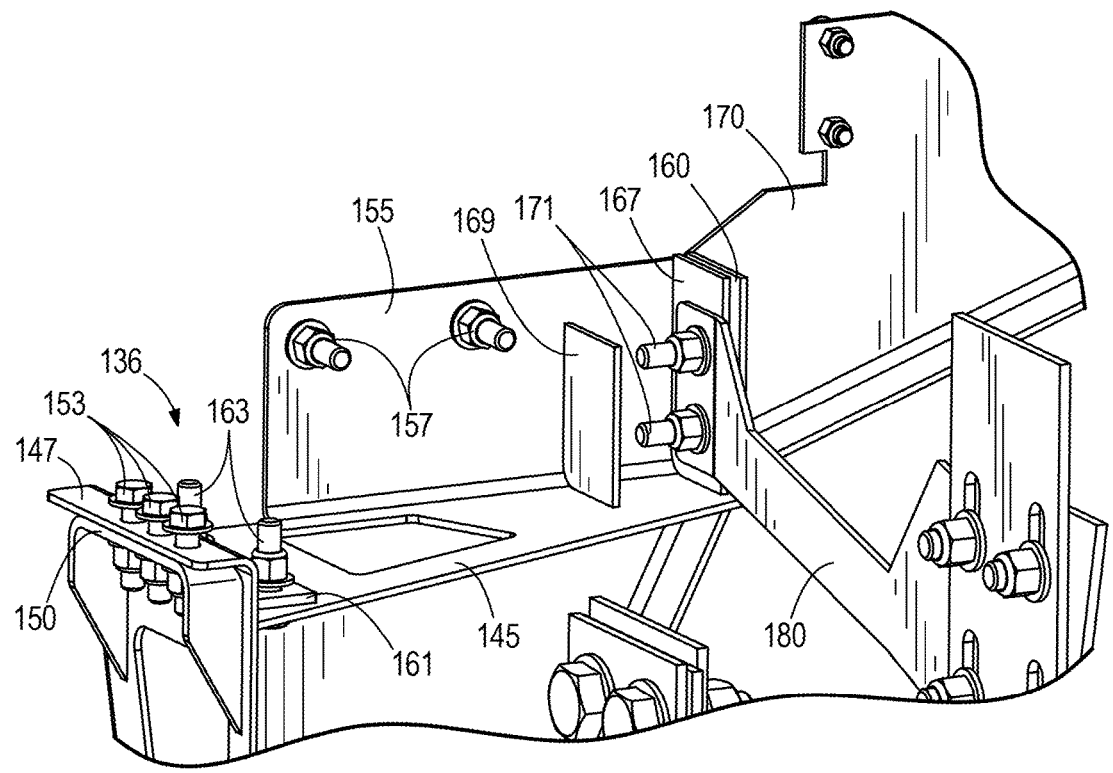
FIG. 11 is a perspective view of an upper end of one of the outboard posts along with a combined joint between the outboard post, a lateral reinforcement member, and a bottom rail reinforcement member.
Figure 12:
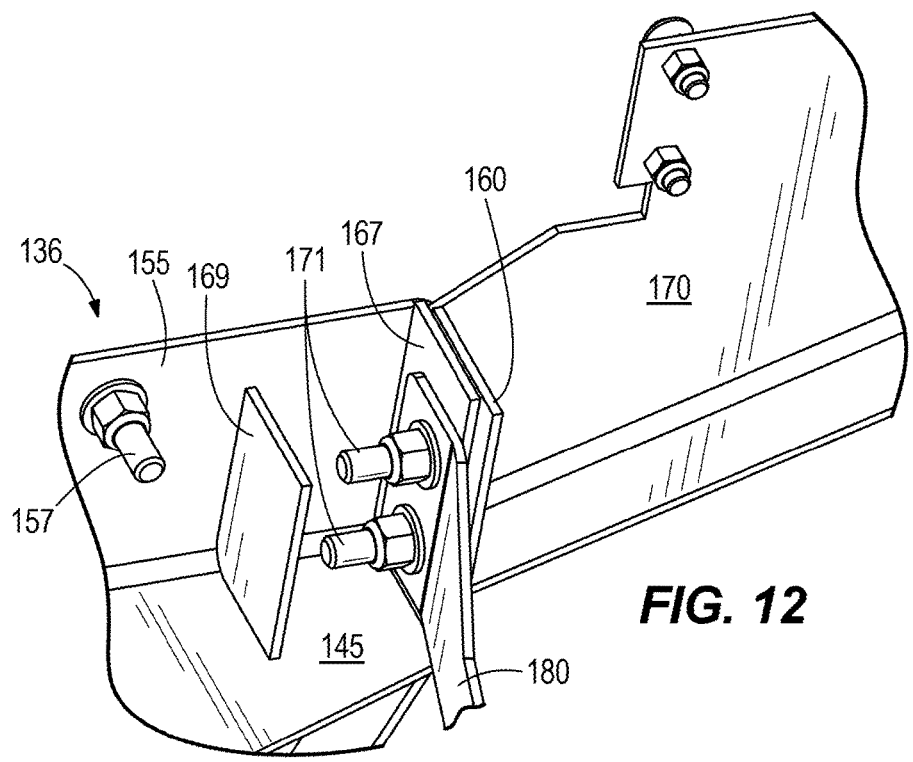
FIG. 12 is another perspective view of the combined joint of FIG. 11.
Figure 13:
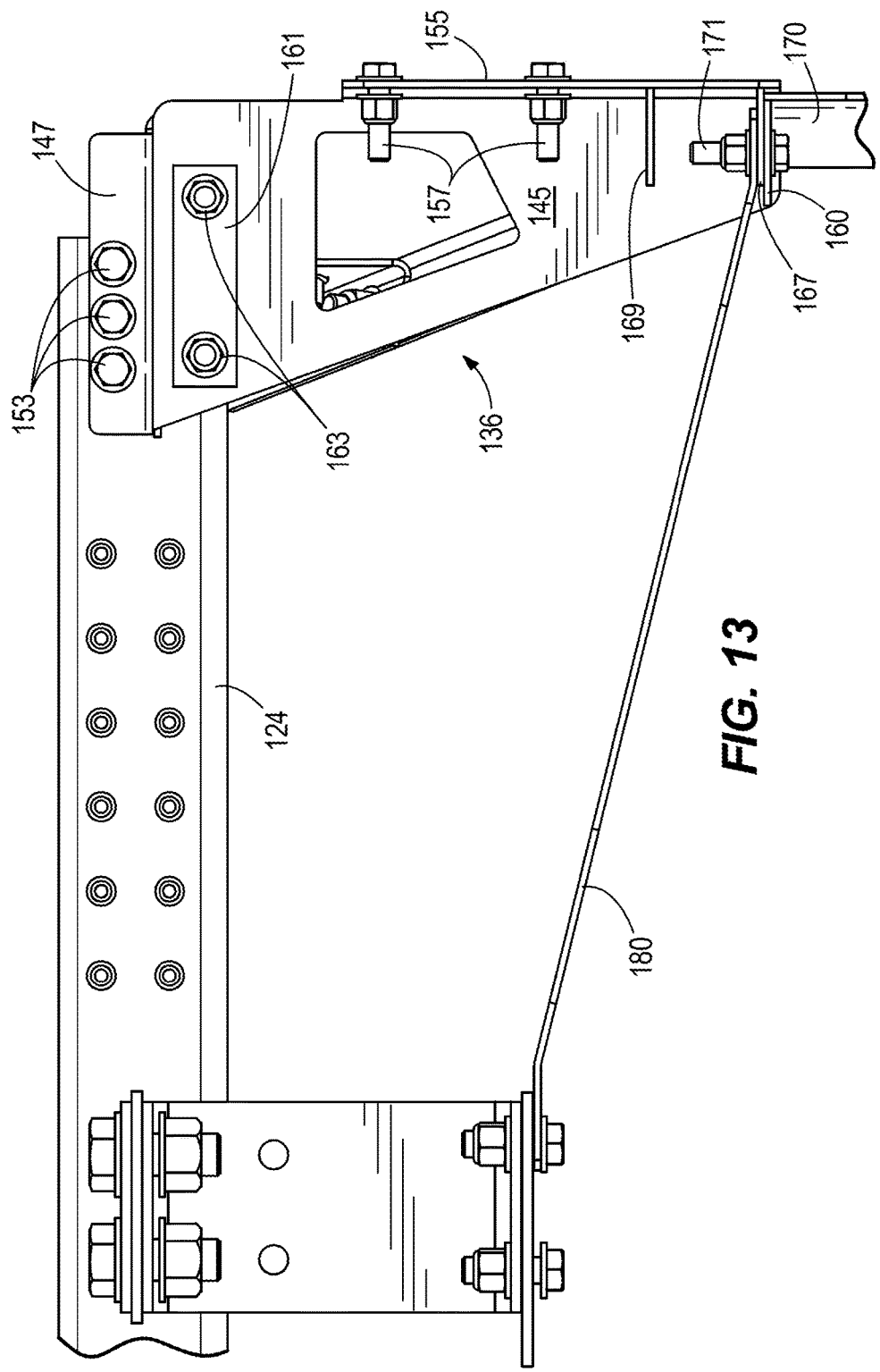
FIG. 13 is a plan view of the laterally outer portion of the rear impact guard.
Figure 14:
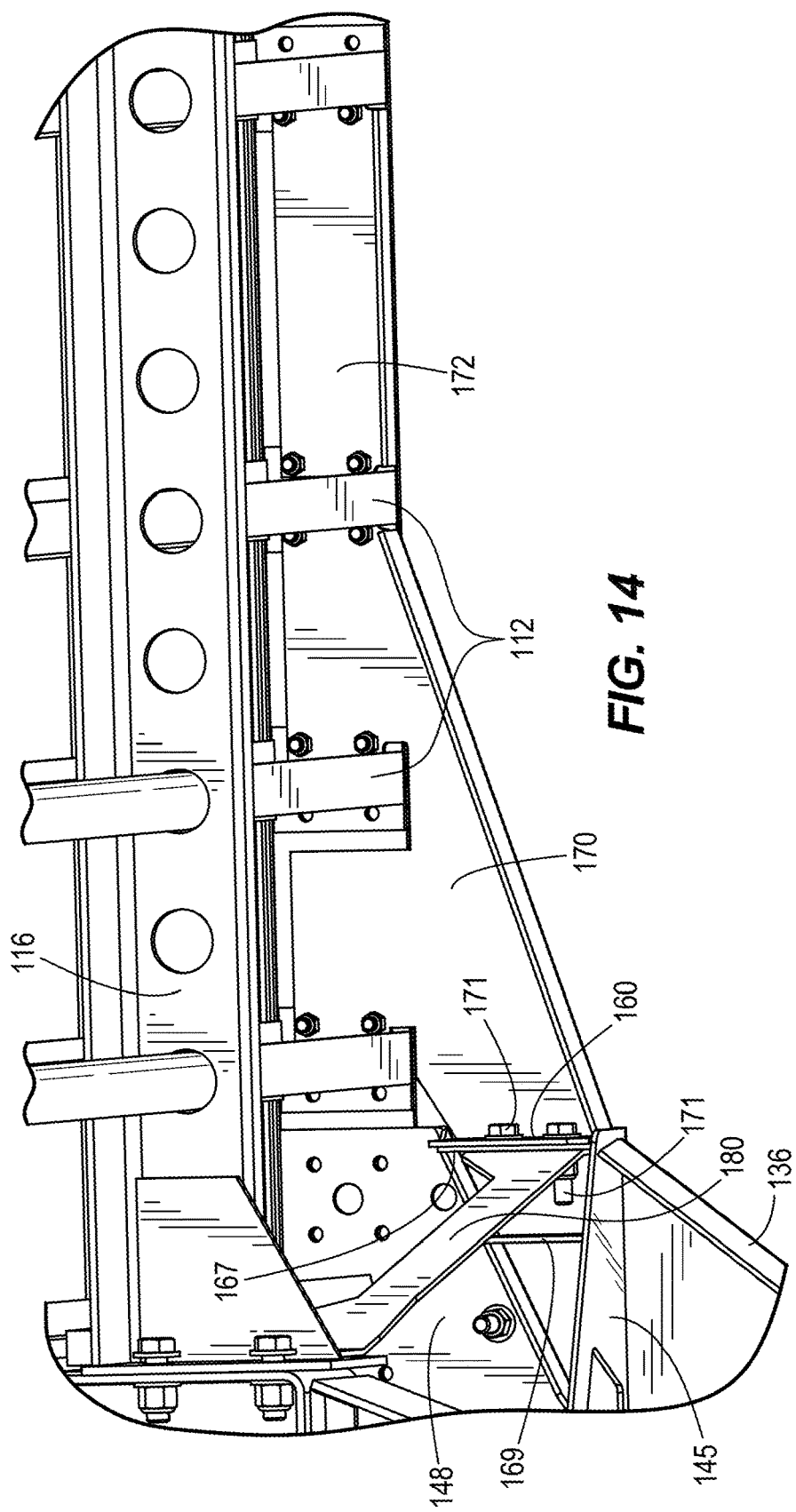
FIGS. 14 and 15 are perspective views from under the trailer, illustrating bottom rail reinforcement members. Several floor cross-members are removed in FIG. 15.
Figure 15:
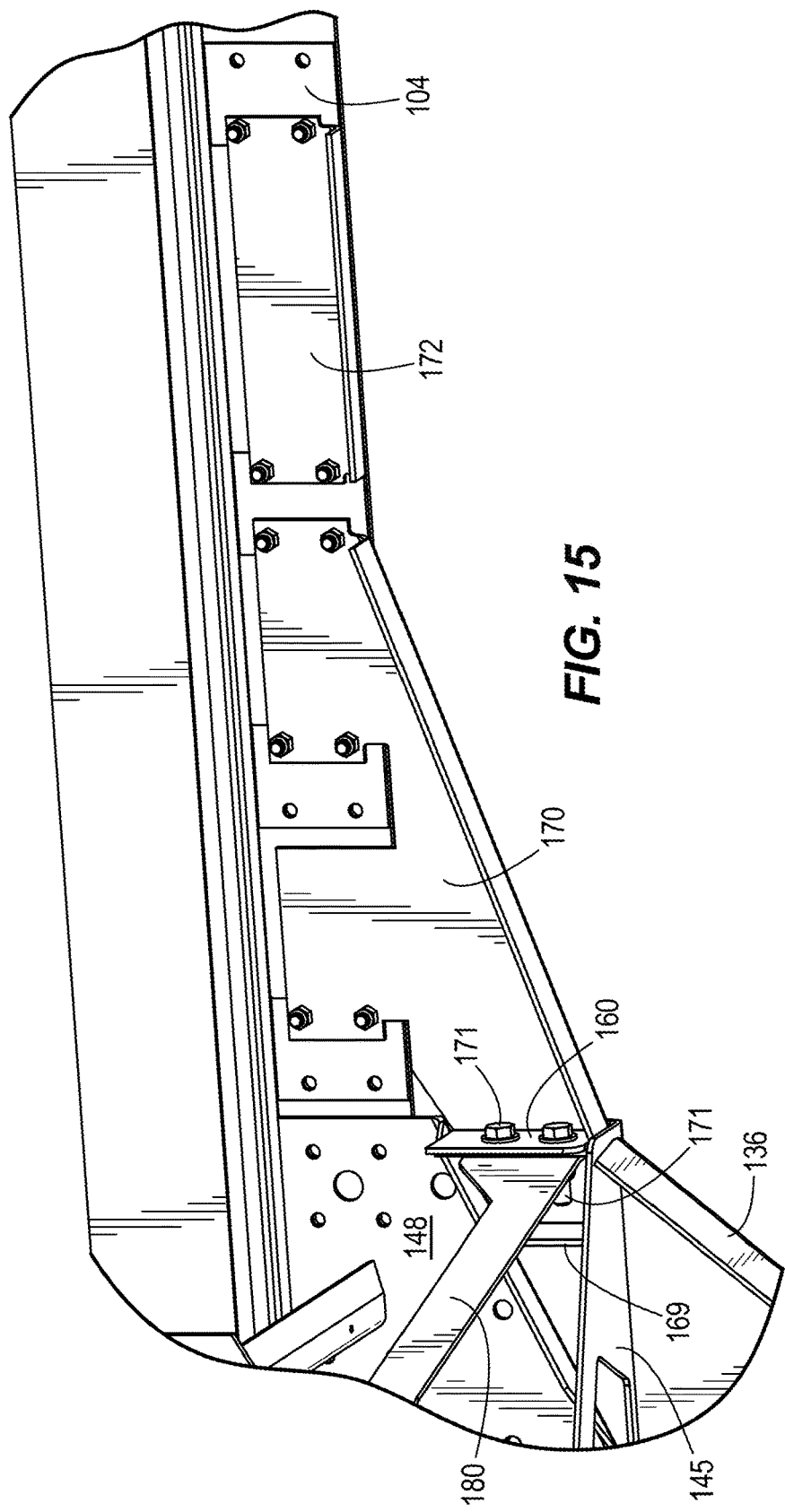

As shown in at least FIGS. 3 and 5-7, the outboard post 136 can further include a horizontal cap or gusset 145 positioned at the upper portion and secured (e.g., via welding, folding of material common to any or all of the panels 140, 142, 144, and the like) with the panels 140, 142, 144 to further strengthen the post and provide a mounting location as discussed below. The gusset 145 can be provided in plate or sheet form and may include at least one aperture for strategic weight relief, one example of which is shown in the drawings. The upper horizontally-lying surface of the gusset 145 may abut corresponding bottom ends of any or all of the rear bolster 128, the rear frame post 108, and the corner gusset 148. In the illustrated construction, a shim plate 161 is provided atop the gusset 145 at the rearward end adjacent the rear panel 140 of the outboard post 136 as shown in at least FIGS. 6, 7 and 11. The shim plate 161 has a thickness equal to a height difference by which the rear frame post 108 extends downwardly past the bottom of the rear bolster 128 (e.g., a return flange 128A of the rear bolster 128). Thus, the outboard post 136 as a whole can abut the bottom end of the rear frame post 108 and the bottom of the rear bolster 128 simultaneously. The shim plate 161 can be welded to the gusset 145. The shim plate 161 and the gusset 145 have mounting apertures for fasteners 163 that are provided to extend vertically and secure the gusset 145 to the return flange 128A of the rear bolster 128 as shown in FIG. 3.

At a lower end, the outboard post 136 is provided with apertures for fastening to a mounting bracket 246 provided on the bumper 124. The outboard post 136 can be provided with at least one aperture in each one of the panels 140, 142, 144, and the mounting bracket 246 has apertures corresponding to the apertures in each panel 140, 142, 144. The outboard post 136 is secured to the mounting bracket 246 solely with a plurality of threaded fasteners 165 as shown in FIGS. 1-7. In other constructions, the bumper 124 can be integrally provided (e.g., welded) with the outboard posts 136 rather than removably fastened, and in other constructions still the bumper 124 can be removably fastened by structures and fasteners other than those expressly shown and described herein.

As shown in FIGS. 1-5, the rear frame post 108 extends lower than the bottom rail 104. A corner gusset 148 of the trailer frame is secured to the rear frame post 108, and the bottom rail 104 and/or at least one of the cross-members 112 to occupy the space forward of the bottom end of the rear frame post 108 and below the rear end of the bottom rail 104. As described below, the corner gusset 148 provides a mounting location for attachment of the outboard post 136 to mount the rear impact guard 120 to the trailer 100. Due to the fact that the rear impact guard 120 is coupled to the trailer frame at the corner gusset 148 as described in further detail below, an increase in loading of the area of the trailer frame including the corner gusset 148 during a rear impact can be expected compared to a rear impact guard with no outboard posts, and additional reinforcement may be provided to the bottom rail 104 immediately adjacent the corner gusset 148.

In some embodiments, such as in the illustrated embodiment, one or more reinforcement members 170, 172 (FIGS. 5 and 10-17) extend directly forward from the corner gusset 148 along a portion of the bottom rail 104 (e.g., alongside at least a bottom portion of the bottom rail 104 and directly alongside an inboard face thereof). These reinforcement members 170, 172 are illustrated and described primarily with respect to the driver's side of the rear impact guard 120 and corresponding outboard post 136, while it will be understood that these features also apply to another corresponding set on the other lateral side, which are formed in mirror images from those shown in detail. A first or primary reinforcement member 170 has a portion (e.g., of triangular shape in side view) that extends below a bottom edge of the bottom rail 104. The illustrated primary reinforcement member 170 has a triangular side profile that tapers in height toward the forward end, although other shapes are possible while still being attached to the other portions of the trailer frame described below. The rearward end of the primary reinforcement member 170 can be positioned on a forward end of the gusset 145 at the upper end of the outboard post 136. With reference again to the illustrated embodiment, in some embodiments the height at the rear end of the primary reinforcement member 170 matches that of the corner gusset 148. The secondary reinforcement member 172 can be positioned forward of the primary reinforcement member 170, and is provided with a size and shape that fits between two adjacent cross-members 112. The secondary reinforcement member 172 can be entirely nested between the cross-members 112, with no gusset portion extending below the cross-members 112 or the bottom rail 104. The secondary reinforcement member 172 provides a reinforced connection between the two adjacent cross-members 112, alongside the bottom rail 104. Each of the primary and secondary reinforcement members 170, 172, which are shown separately from the remaining structures in FIGS. 16 and 17, can have an L-shaped cross-section.

Figure 5:
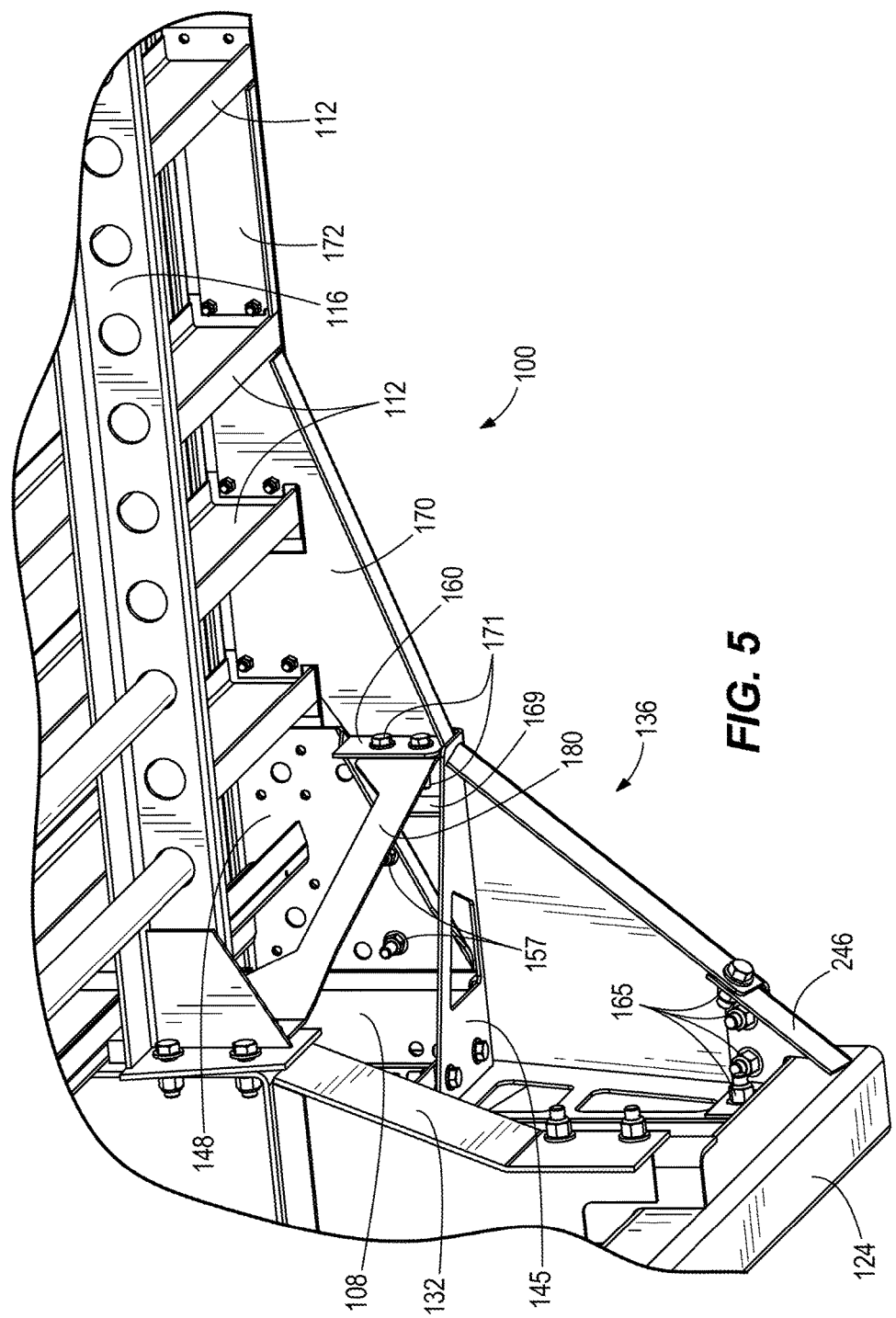
FIG. 5 is a perspective view of the laterally outer portion of the trailer of FIG. 2, viewed from underneath the trailer.

The primary reinforcement member 170 features recesses 174 that receive the ends of the cross-members 112 as shown in FIG. 5 so that the primary reinforcement member 170 form-fits around one or more of the cross-members 112. The design of the reinforcement members 170, 172 allows retrofitting an existing trailer 100 in which all the cross-members 112 are provided with equal length, and does not require modification of removal of the cross-members 112 since the reinforcement members 170, 172 are not sandwiched between the bottom rail 104 and the ends of the cross-members 112. The primary reinforcement member 170 can be provided with mounting holes to be secured with fasteners to the bottom rail 104.

As shown in FIGS. 5 and 10-17, a flange or gusset 160 perpendicular to both portions of the L-shaped primary reinforcement member 170 is provided at the rearward end of the primary reinforcement member 170. The gusset 160 is formed as a sheet or plate that extends in a vertical direction and transverse to the longitudinal direction of the trailer 100. The gusset 160 includes at least one mounting aperture for receiving a fastener 171. In the illustrated construction, the gusset 160 includes two vertically-spaced mounting apertures configured to receive two fasteners 171 (e.g., bolts) so that the fasteners extend horizontally. The mounting apertures are configured to receive the fasteners 171 so that the fasteners extend parallel to the longitudinal direction of the trailer 100. The fastened joint provided by the gusset 160 and the corresponding fasteners can be a combination joint with the outboard post 136 and at least one additional reinforcement member 180 as described in further detail below. However, a detailed description of the structure of the outboard post 136 is first provided.

Figure 2:
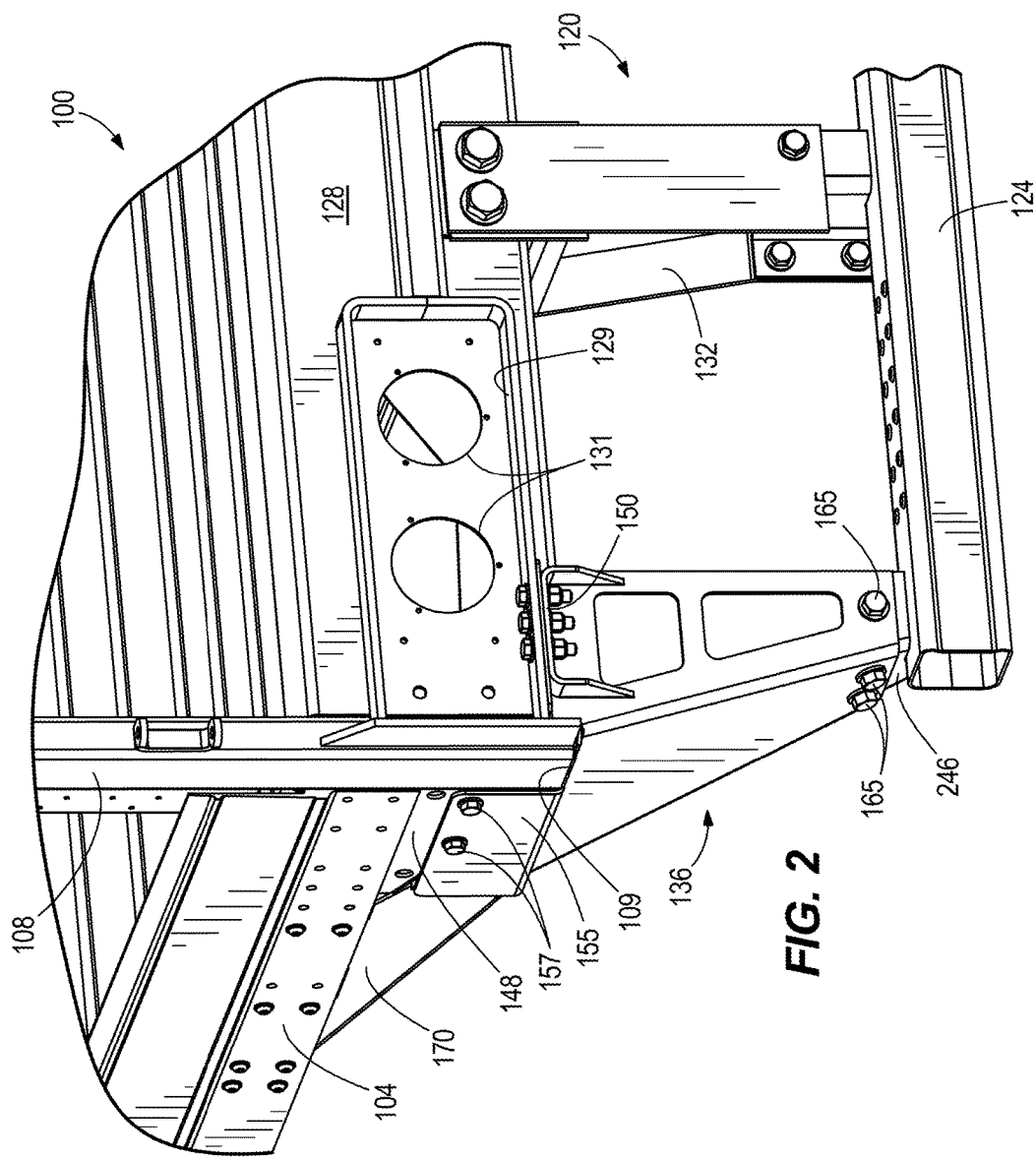
FIG. 2 is a detail perspective view of a laterally outer portion of the trailer shown in FIG. 1, including an outboard post.

The outboard post 136 has an upper portion that wraps around the lower rear corner of the trailer frame to connect to the trailer frame directly inboard of the rear frame post 108 and directly forward of the rear frame post 108. As such, a lower end of the rear frame post 108 nests into a recess 109 formed by the upper end of the outboard post 136 as shown in FIGS. 2, 6, and 7. With continued reference to the outboard post 136 of the illustrated embodiment shown in FIGS. 6 and 7, a rearward-extending horizontal first flange is formed at the upper end of the rear panel 140. The first flange can be defined as two overlaid sheet or plate sections, a first 147 of which can be provided as an integral extension of the rear panel 140 and a second 150 of which can be permanently secured (e.g., by welding) to a rear face of the rear panel 140. As shown, the second plate section 150 can be part of a U-shaped bracket or gusset that is welded to the rear face of the rear panel 140 at its upper end. Although providing multiple overlaid plate sections increases the strength of a fastener joint made at the first flange, in other constructions, the first flange can be provided by a single plate section having a suitable thickness. The first flange provided by the first and second plate sections 147, 150 can be positioned directly adjacent (e.g., below) a horizontal plate or flange of the rear bolster 128 to be secured with fasteners 153 thereto. For example in the illustrated construction, the horizontal lower portion of the light guard 129 is utilized so that mounting apertures provided in the first flange align with the apertures 133 in the light guard 129 and a plurality of laterally-spaced fasteners 153 extend therethrough to fasten the joint. The fasteners 153 are arranged to extend vertically through the first flange and the horizontal lower portion of the light guard 129. The fasteners 153 are arranged to be stressed primarily in tension upon a rear impact to the bumper 124. In other constructions (e.g., those without a light guard 129), the first flange can be secured with another horizontal flange or wall of the rear bolster 128.

The upper end of the outboard post 136 further includes an upward-extending vertical second flange 155. The second flange 155 can be formed of a sheet or plate that defines a vertical plane, perpendicular to a horizontal plane defined by the gusset 145 and the horizontal plane defined by the plate sections 147, 150 of the first flange. The second flange 155 can be a bent sheet portion formed integrally with the gusset 145. The second flange 155 includes multiple apertures aligned with corresponding apertures provided in the trailer frame, and fasteners 157 are engaged with the apertures of the second flange 155 and the corresponding apertures in the trailer frame to secure the outboard post 136 to the trailer frame. In particular, the second flange 155 is arranged alongside a laterally outboard surface of the corner gusset 148 and is fastened to the corner gusset 148 (e.g., with two fasteners 157). Each of the fasteners 157 joining the second flange 155 and the corner gusset 148 are arranged to extend horizontally and in a direction transverse to the longitudinal direction of the trailer 100. The fasteners 157 are arranged to be stressed primarily in shear upon a rear impact to the bumper 124.

As shown in at least FIGS. 6, 7, 11, and 12, the outboard post 136 can include additional vertical gussets at its upper end between the horizontal gusset 145 and the vertical second flange 155. These can include a first vertical gusset 167 at the forwardmost end and a second vertical gusset 169 spaced rearwardly from the first vertical gusset 167. Each of the first and second vertical gussets 167, 169 can be welded in place (e.g., welded partially or fully along seams with both the gusset 145 and the second flange 155). The second vertical gusset 169 may have a reduced vertical height compared to the first vertical gusset 167 as shown. While both the vertical gussets 167, 169 provide additional strength to the upper end of the outboard post 136, the first vertical gusset 167 is further utilized to make a combined joint, or in particular a three-member joint using at least one fastener 171 that extends horizontally and parallel to the longitudinal direction of the trailer 100. Secured by the fasteners 171 are three stacked material sheets, including the first vertical gusset 167 at the forward end of the outboard post 136, the gusset 160 at the rearward end of the primary reinforcement member 170, and an end flange of a lateral reinforcement member 180 or "cross brace", all of which have corresponding aligned apertures to receive the fasteners 171. The lateral reinforcement member 180 extends from its first end at the aforementioned joint to a second end that is spaced in a direction laterally inboard and rearward of the first end. The second end of the lateral reinforcement member 180 can be secured to any available structural member of the trailer frame. In the illustrated construction, the lateral reinforcement member 180 is coupled with fasteners at a joint where the upper end of the inboard post 132 joins the slider rail 116 beneath the trailer floor. The lateral reinforcement member 180 is loaded in tension upon rear impact upon the bumper 124. Thus, the lateral reinforcement member 180 can be provided by a rigid member such as a sheet, a bar, a plate or a tube of material (e.g., steel) or alternately by a non-rigid member such as a chain, a cable, etc. The lateral reinforcement member 180 reinforces the lower corner of the trailer frame to inhibit rolling or folding over during a rear impact where loads are transferred to the lower corner of the trailer frame from the outboard posts 136.

By designing the outboard posts 136 of the rear impact guard 120 and the reinforcement members (i.e., the primary and secondary reinforcement members 170, 172 for the bottom rail 104 and the lateral reinforcement members 180) to be bolted onto the trailer frame, the rear impact guard 120 as a whole and/or components thereof may be simply retrofitted without welding or removing existing components. For example, the corner gussets 148 of the trailer 100 may be welded in place at the time of original manufacture (e.g., in producing the pre-existing trailer 1000 of FIG. 18). The rear impact guard 120 does not modify, remove, or replace the existing corner gussets 148, but rather reinforces them with additional components to complement the added strength provided by the addition of the outboard posts 136, which allow much greater rear impact loads to be transferred to the outer corners of the trailer frame. The rear impact guard 120 is also made serviceable in the field with minimal time and cost, and minimal risk of damaging the trailer 100. For example, in the event of cosmetic or minimal damage to an outboard post 136 or to the bumper 124, the individual component (or the rear impact guard 120 as a whole) may be removed by simply removing bolted connections, and can then be replaced. Although bolts and nuts may be utilized throughout the rear impact guard 120 as shown and described, it will be understood that other types of threaded fasteners may instead be utilized, as can any other type of removable fastener. In this regard, as used herein the term "bolt-on" shall not be interpreted as limiting specifically to the use of bolts. The removable fasteners used at the various joints joining the rear impact guard 120 to the can trailer frame can include fasteners adapted for non-destructive removal and re-use (i.e., multi-use or reusable fasteners) as opposed to single-use fasteners. In some constructions, the rear impact guard 120 is attached to the trailer frame entirely without any permanent securements, such as welds.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, one having ordinary skill in the art will appreciate that specific features of the numerous embodiments disclosed may be mixed and matched in other ways where not specifically inhibited, even though specific illustration of such embodiments may not be exhaustively covered herein.

What is claimed is:

1. A trailer comprising:
    a front end provided for attachment to a truck;
    a rear end spaced in a longitudinal direction from the front end to define a cargo area between the front and rear ends;
    a frame, the frame including
        a rear bolster extending in a transverse direction across the rear end of the trailer below a bottom rear edge of the cargo area, and
        a pair of spaced rear frame posts extending upwardly from respective distal ends of the rear bolster; and
    a rear impact guard including a bumper extending transversely and spaced below the rear bolster, a pair of outboard posts extending between the bumper and the rear bolster adjacent the respective distal ends of the rear bolster, and at least one inboard post extending between the bumper and the rear bolster at a location between the pair of outboard posts,
    wherein each of the pair of outboard posts is provided with a rearward-extending horizontal first flange and an upward-extending vertical second flange spaced forwardly of the horizontal first flange, each of the first and second flanges including multiple apertures aligned with corresponding apertures provided in the trailer frame, each of the multiple apertures accommodating a removable fastener securing the rear impact guard to the trailer frame at a respective one of the first and second flanges.

2. The trailer of claim 1, wherein each of the pair of outboard posts is formed as an open cross-section profile from multiple panels that extend between upper and lower ends of the outboard post, and wherein a top gusset extends between the multiple panels, the top gusset positioned to support the rear bolster from below.

3. The trailer of claim 2, wherein at least one additional removable fastener is provided to extend through and securely join the top gusset with the rear bolster.

4. The trailer of claim 1, wherein the trailer frame further includes a pair of corner gussets, each of which is secured in position to fortify a joint between a bottom end of one of the pair of rear frame posts and a respective lower rail of the trailer frame extending forwardly from the rear frame post, and
    wherein the second flange of each outboard post overlies the respective corner gusset in side view so that the multiple apertures of the second flange are aligned with corresponding apertures formed in the corner gusset and the corresponding removable fasteners extend through the second flange and the corner gusset to secure the rear impact guard to the trailer frame.

5. The trailer of claim 1, further including a pair of lateral reinforcement members, each of which is fastened in place with removable fasteners to extend from a first location at a respective lateral edge of the trailer frame and a second location spaced laterally-inward and rearward of the first location so that the lateral reinforcement member is loaded in tension upon rear impact of an object with the bumper at the respective outboard post.

6. The trailer of claim 1, wherein the rear bolster further includes a light guard at least partially surrounding at least one tail light aperture formed therein, the light guard providing the apertures corresponding to the apertures in the rearward-extending horizontal first flange of each of the pair of outboard posts.

7. The trailer of claim 1, wherein the trailer frame further includes a plurality of cross-members extending transversely at intervals spaced forwardly of the rear bolster.

8. The trailer of claim 1, wherein the horizontal first flange of each of the pair of outboard posts is laterally spaced from the adjacent one of the pair of rear frame posts, and positioned vertically above a bottom end thereof.

9. The trailer of claim 1, wherein each of the pair of outboard posts includes a plurality of panels that extend between upper and lower ends of the outboard post, and wherein the horizontal first flange has a forwardmost edge terminating at a rearmost surface of a rearmost one of the plurality of panels.

10. The trailer of claim 9, wherein the horizontal first flange of each of the pair of outboard posts is formed at least in part by an upper portion of a U-shaped bracket.

11. The trailer of claim 1, wherein the pair of outboard posts and the at least one inboard post are secured to the trailer frame exclusively with removable fasteners.

12. A trailer comprising:
a front end provided for attachment to a truck;
a rear end spaced in a longitudinal direction from the front end to define a cargo area between the front and rear ends;
a frame, the frame including
    a rear bolster extending in a transverse direction across the rear end of the trailer below a bottom rear edge of the cargo area, the rear bolster including at each end a light guard at least partially surrounding at least one tail light aperture formed therein,
    a pair of spaced rear frame posts extending upwardly from respective distal ends of the rear bolster,
    a pair of lower rails extending forwardly from respective lower portions of the pair of rear frame posts, and
    a pair of corner gussets, each of which is secured in position to fortify a joint between one of the pair of rear frame posts and a respective one of the pair of lower rails; and
a rear impact guard including a bumper extending transversely and spaced below the rear bolster, a pair of outboard posts extending between the bumper and the rear bolster adjacent the respective distal ends of the rear bolster, and at least one inboard post extending between the bumper and the rear bolster at a location between the pair of outboard posts,
wherein each of the pair of outboard posts is secured to the trailer frame with a plurality of joints, each of the plurality of joints including at least one removable fastener, the plurality of joints including
    a first joint established between a first flange of the outboard post and the light guard, and
    a second joint established between a second flange of the outboard post and the corner gusset.

13. The trailer of claim 12, wherein the first flange is a rearward-extending horizontal flange, and the second flange is an upward-extending vertical flange spaced forwardly of the horizontal first flange.

14. The trailer of claim 12, wherein each of the pair of outboard posts includes a plurality of panels that extend between upper and lower ends of the outboard post, and wherein the horizontal first flange has a forwardmost edge terminating at a rearmost surface of a rearmost one of the plurality of panels.

15. The trailer of claim 14, wherein the horizontal first flange of each of the pair of outboard posts is formed at least in part by an upper portion of a U-shaped bracket.

16. The trailer of claim 12, wherein the plurality of joints of each of the pair of outboard posts includes a third joint established between the trailer frame and a top gusset of the outboard post that supports one or both of the rear frame post and the rear bolster from below.

17. The trailer of claim 16, wherein each of the first, second, and third joints includes multiple removable fasteners.

18. The trailer of claim 16, wherein all of the removable fasteners of the first, second, and third joints are reusable fasteners.

19. The trailer of claim 12, further including a pair of lateral reinforcement members, each of which is fastened in place with removable fasteners to extend from a first location at a respective lateral edge of the trailer frame and a second location spaced laterally-inward and rearward of the first location so that the lateral reinforcement member is loaded in tension upon rear impact of an object with the bumper at the respective outboard post.

20. The trailer of claim 12, wherein the trailer frame further includes a plurality of cross-members extending transversely at intervals spaced forwardly of the rear bolster.

21. The trailer of claim, 12 wherein the first joint is laterally spaced from the adjacent one of the pair of rear frame posts, and positioned vertically above a bottom end thereof.

22. The trailer of claim 12, wherein the pair of outboard posts and the at least one inboard post are secured to the trailer frame exclusively with removable fasteners.

23. A rear impact guard kit for converting an existing trailer rear impact guard having a bumper with free distal ends to a rear impact guard in which the distal bumper ends are secured to a rear bolster of the trailer, the kit comprising:
a pair of outboard posts, each of which includes a lower end adapted for securement with a respective one of the distal bumper ends and an upper end adapted for securement with a respective distal end of the rear bolster;
for each of the pair of outboard posts, at least one reinforcement member configured to fortify a joint between a trailer frame rear frame post and a trailer frame lower rail at the distal end of the rear bolster;
for each of the pair of outboard posts, a first fastener extending vertically to define a first joint along a rearward portion of the upper end of the outboard post; and
for each of the pair of outboard posts, a second fastener extending horizontally to define a second joint along a laterally outboard portion of the upper end of the outboard post.

* * * * *